March 18, 1952  D. F. BOWMAN  2,589,664
ANTENNA SYSTEM
Filed Aug. 30, 1949
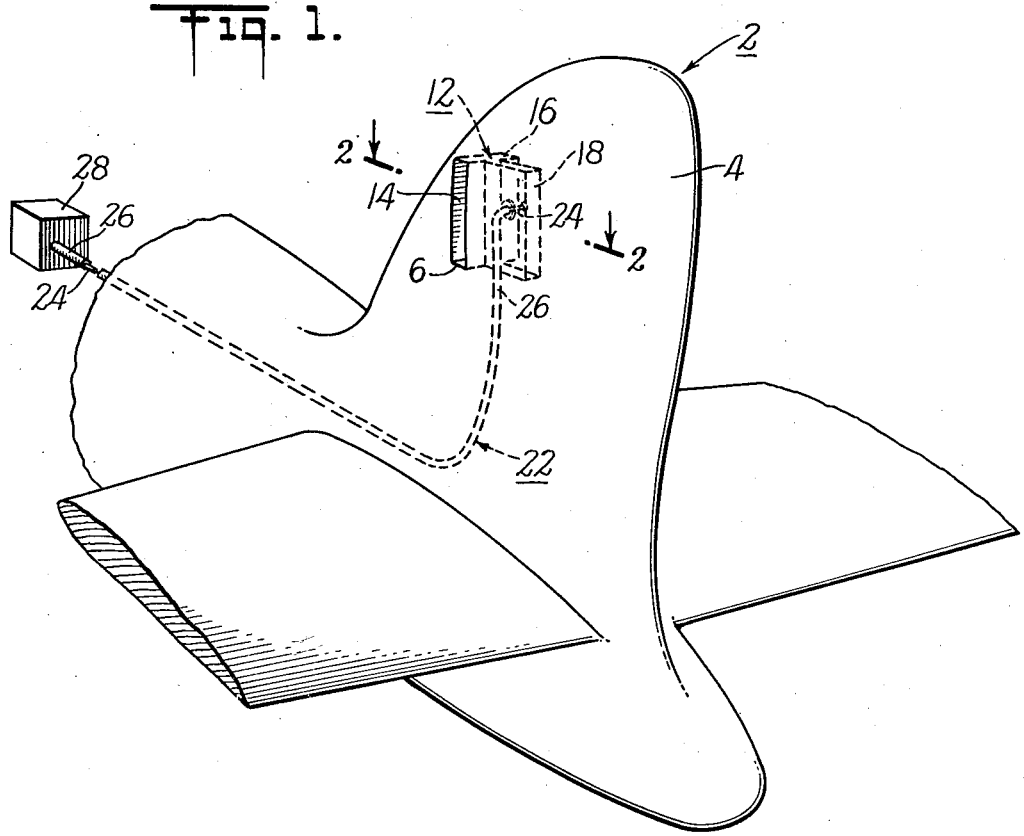
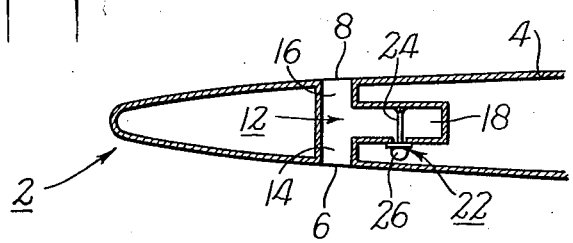
INVENTOR
David F. Bowman
BY
Curtis, Morris + Safford
ATTORNEYS Patented Mar. 18, 1952

2,589,664

UNITED STATES PATENT OFFICE 2,589,664

ANTENNA SYSTEM

David F. Bowman, Mineola, N. Y., assignor to Airborne Instruments Laboratory, Inc., Mineola, N. Y.

Application August 30, 1949, Serial No. 113,220

8 Claims. (Cl. 250—33.63)

This invention relates to the radiation and reception of electro-magnetic energy and is described particularly as embodied in an aircraft antenna.

Both military and civilian aircraft carry radio apparatus for performing various navigation, communication, and other functions. But, as the operating speeds of aircraft have increased, the designs of their airfoils have become increasingly critical, and the configurations of the airfoils are now dictated largely by aerodynamic considerations, rather than by desired functions associated with auxiliary apparatus. Radio apparatus, therefore, must be designed so that it causes minimum change in the selected configurations of the exterior aircraft surfaces, and it is, thus, important that antennas for use in aircraft be designed so that no portion of the antenna protrudes from the surface of the aircraft.

Moreover, it is often desirable that each antenna operate efficiently over a wide frequency range. This is particularly important in aircraft antenna systems because the number of antennas which can be installed conveniently in a given aircraft is limited, and it is desirable, therefore, to use a single antenna to perform more than one function; for example, by means of switches arranged to connect the antenna system to various pieces of radio equipment as required. Such equipments usually operate on different frequencies which may be relatively widely separated in the radio frequency spectrum. In addition, some of the electronic apparatus is tunable so that it can be adjusted to operate on any of several frequencies. It is obviously desirable, therefore, that each antenna operate efficiently over a wide range of frequencies.

As a result of the search for such non-protruding antennas, it has been found possible to radiate and receive energy by means of a slot cut in the conductive outer surface of the aircraft and covered over with a thin sheet of plastic, or other suitable dielectric material. The slot usually is energized by means of conductors connected near the edges of the slots or by cavities positioned within the aircraft adjacent these slots. However, such slot antennas do not radiate uniformly in all directions from the aircraft. For example, if such a slot is installed in one side of the fuselage on an aircraft, the body of the aircraft will, in effect, form a shadow preventing efficient transmission of energy to points on the opposite side of the aircraft.

It has been proposed to overcome this disadvantage by positioning two such slots in opposite sides of the aircraft and to connect these slots to radiate or receive energy simultaneously and, thus, to obtain a more uniform radiation pattern, giving better all-round coverage.

In order to secure efficient operation of such an arrangement of opposed slots, that is, slots in opposite sides of the aircraft or portions of the aircraft, it is necessary to maintain a particular phase relationship of the radio waves radiated from the two slots. For example, to obtain good all-round coverage with two slots positioned in opposite sides of an aircraft structure, for example, the vertical stabilizer, it is necessary to maintain such phase relationship between the energy radiated from the two slots that the fields produced by the two slots are in-phase where they overlap.

When this in-phase relationship exists, the overlapping portions of the two fields add together to reinforce the intensity of radiation in the fore and aft directions where it might otherwise be very low. That is, the currents induced in the conductive surface of the aircraft by each of the slots are made to flow, at any instant, around the aircraft in the same direction, for example, clockwise. This condition will be referred to as in-phase excitation of the slots.

It is not particularly difficult to obtain this desired phase relationship at any given frequency, but the frequency range over which the optimum phase relationship is maintained, by conventional arrangements, is usually very limited. One proposed system for obtaining wide-band operation of dual-slot antenna systems is to provide a tuning arrangement so that the phase shifting portions of the antenna system can be adjusted or tuned whenever the frequency of operation is changed. Such adjustment, however, requires a certain amount of skill on the part of the operator and is usually a tedious and time-consuming task. Moreover, the antenna and its associated tuning circuits may be positioned in parts of the aircraft which are not easily accessible, and complex and expensive remote-controlled tuning systems would be required.

In accordance with the present invention a dual-slot antenna structure is provided in which the slots are excited, effectively, in series and the phase relationship of the energy radiated by the slots is substantially independent of the dimensions of the antenna structure, thus permitting wide-band operation of the antenna without requiring any manipulation of tuning controls to maintain or re-establish the desired phase relationship. Thus, one aspect of the invention relates to an improved cavity feed system for dual-slot antennas. Another aspect of the invention relates to the feeding of energy to slots in opposite sides of a conducting structure in which the energy transmitted by the two slots is maintained in predetermined phase relationship effectively independently of the applied frequency. Another aspect of the invention relates to a T-shaped cavity for feeding energy to or from two oppositely-disposed slots in a structure having a conductive surface.

These and other aspects, advantages, and objects of the invention will be in part apparent from and in part pointed out in the following description considered in conjunction with the accompanying drawing in which:

Figure 1 is a perspective view of a vertical stabilizer of an aircraft showing one slot of a dual-slot antenna system embodying the invention, portions of the antenna structure within the stabilizer being shown in phantom; and Figure 2 is an enlarged horizontal cross-sectional view taken on line 2—2 of Figure 1.

Generally speaking, the characteristics of a given antenna are the same, if properly interpreted, irrespective of whether the antenna is used for transmitting or receiving. This equivalence follows from an extension of the well-known reciprocity theorem of electrical circuits. Although the discussion herein refers for the most part to the transmission of electromagnetic energy, the interpretation of the present disclosure is not to be so limited. Accordingly, the terms used herein with relation to the radiation or reception of electromagnetic energy are to be interpreted as referring to either phenomenon.

As shown in the drawings, a vertical stabilizer, generally indicated at 2, of an aircraft having an outer conductive skin or covering 4, is provided with two slots 6 and 8, positioned, respectively, on opposite sides of the stabilizer 2. In this embodiment of the invention, the antenna system is adapted to radiate horizontally polarized energy and the slots extend vertically in the stabilizer 2. These slots desirably are covered with plastic or other insulating material so as not to disturb the operation of the airfoils.

The two slots 6 and 8 are connected within the stabilizer 2 by a cavity, generally indicated at 12, of T-shaped cross-section, the walls of which are formed of suitable conductive material, for example, sheet copper. The cavity 12 comprises a left slot-feeding portion 14, a right slot-feeding portion 16, and an energizing portion 18.

The desired phase relationship for the energization of the slots is the condition where the electric vectors across the slot are pointed in the same direction proceeding horizontally around the stabilizer 2. In order to maintain this phase relationship over wide frequency ranges the slots are energized by means of the T-shaped cavity 12 in which the two slot-feeding portions 14 and 16 are energized from the auxiliary energizing portion 18. To conduct energy into this cavity portion, a coaxial transmission line, generally indicated at 22, having an inner conductor 24 and an outer conductor 26, extends between the cavity 12 and an energy source, indicated in block form at 28, for example, a radio transmitter. The inner conductor 24 of the line 22 extends through, and is insulated from, a first vertical wall of the cavity portion 18, extends across the cavity, and is secured to the inner surface of the opposite wall. The outer conductor 26 of line 22 is secured to the outer surface of the first wall of the cavity at a point adjacent the opening through which the inner conductor 24 passes. The exact position at which the transmission line 22 is coupled to the cavity energizing portion 18 will depend upon the impedance of the cavity structure and of the transmission line over the desired operating range of frequencies. The selection of a suitable position to provide the best impedance match between the antenna structure and the transmission line is well within the skill of the art, as is the substitution of other wideband coupling or impedance matching arrangements.

By means of the above cavity-feeding arrangement the energy is so transferred within the cavity 12 that the two slots 6 and 8 are, in effect, fed in series and the correct phase relationships are maintained substantially independently of the operating frequency, thus insuring all-round coverage over a wide frequency range. In one typical antenna structure embodying the invention, the slots 6 and 8 were approximately 0.6 wave length in height, and .069 wave length in width.

Although only one embodiment of the invention has been shown, it is apparent that it is well adapted to obtain the ends and objects heretofore set forth, and that it is subject to a wide variety of modifications as may be necessary or desirable to adapt the invention to particular uses or structural arrangements.

I claim:

1. An aircraft antenna system including a vertical stabilizer having an outer conductive skin with first and second oppositely disposed slots therein, a conductive body providing a cavity having a first slot-feeding portion terminating in said first slot, a second slot-feeding portion terminating in said second slot and connected to said first slot-feeding portion, and an energizing portion having its longitudinal axis in a plane perpendicular to the plane of the longitudinal axes of said first and second slot-feeding portions and connected to said first and second slot-feeding portions at the junction thereof, and a transmission line coupled to said energizing portion for energizing said slots.

2. An aircraft antenna system including a vertical stabilizer having an outer conductive skin with first and second oppositely disposed slots therein, a conductive body providing a cavity having a first slot-feeding portion terminating in said first slot, a second slot-feeding portion terminating in said second slot and connected to said first slot-feeding portion, and an energizing portion having its longitudinal axis in a plane perpendicular to the plane of the longitudinal axes of said first and second slot-feeding portions and connected to said first and second slot-feeding portions at the junction thereof, a transmission line having first and second conductors, said first conductor extending transversely across sad energizing cavity portion and secured to one wall thereof, and said second conductor being secured to the opposite wall of said energizing portion, and a source of electromagnetic energy coupled to said transmission line.

3. In a faired-in aircraft antenna system, a dual-slot feeding arrangement for maintaining a predetermined phase relationship of the signals radiated by said slots including a vertical stabilizer having an outer conductive skin with first and second radiating slots in said skin positioned on opposite sides of said stabilizer, a hollow conductive body providing a cavity having a T-shaped cross-section connecting said slots within said stabilizer, said slots being located, respectively, at opposite ends of the cross of the T formed by the cross-section of said cavity, and a transmission line coupled to said cavity near the base portion of the T formed by said cavity for conducting electrical energy to or from said slots.

4. An antenna system including an aircraft having an outer conductive skin with first and second radiating slots in said skin and on opposite sides of said aircraft, a hollow conductive body providing a cavity having a first slot-feeding portion terminated by said first slot and extending inwardly of said aircraft, a second slot-feeding portion terminated by said second slot and extending inwardly of said aircraft, and an energizing portion positioned perpendicularly to said slot-feeding portions, said energizing portion being connected to said first and second slot-feeding portions at a point equidistant from said slots, and a radio-frequency conductor coupled to said cavity energizing portion for transferring radio energy to or from said slots.

5. A faired-in antenna system for radiating radio frequency energy comprising a structure having first and second spaced outer conductive surfaces with first and second slots in said first and second surfaces, respectively, a conductive body providing a cavity having a T-shaped cross-section, the cross-bar of said T-shaped cross-section connecting said slots within said structure, and a transmission line coupled to said cavity near the base of said T-shaped cross-section for transferring energy to or from said cavity.

6. Apparatus as claimed in claim 5 wherein said conductive surfaces comprise opposite surfaces of a vertical stabilizer of an aircraft.

7. An aircraft antenna system including a vertical stabilizer having an outer conductive skin with first and second oppositely-disposed vertically-extendng slots therein, a conductive body providing a cavity having a first slot-feeding portion terminating in said first slot, a second slot-feeding portion terminating in said second slot and connected to said first slot-feeding portion, and an energizing portion having an axis in a plane perpendicular to the plane of the longitudinal axes of said first and second slot-feeding portions and connected to said first and second slot-feeding portions at the junction thereof, and a transmission line coupled to said energizing portion for energizing said slots.

8. An aircraft antenna system including a vertical stabilizer having an outer conductive skin forming spaced opposed conductive surfaces, each of said surfaces having a slot therein for the radiation of electromagnetic energy, a conductive body providing a cavity having a slot feeding portion connecting said slots, and an energizing portion opening into and extending at an angle from said slot feeding portion, and a transmission line coupled to said energizing portion for energizing said slots.

DAVID F. BOWMAN.

REFERENCES CITED

The following references are of record in the file of this patent:

UNITED STATES PATENTS

| Number | Name | Date |
|---|---|---|
| 2,400,867 | Lindenblad | May 21, 1946 |
| 2,414,266 | Lindenblad | Jan 14, 1947 |
| 2,425,303 | Carter | Aug. 12, 1947 |
| 2,445,895 | Tyrrell | July 27, 1948 |
| 2,459,768 | Cork et al. | Jan. 18, 1949 |